United States Patent [19]
Maejima

[11] Patent Number: 6,023,115
[45] Date of Patent: Feb. 8, 2000

[54] MAGNETIC BEARING APPARATUS WITH RADIAL POSITION CORRECTING ELECTROMAGNET

[75] Inventor: Yasushi Maejima, Narashino, Japan

[73] Assignee: Seiko Seiki Kabushiki Kaisha, Japan

[21] Appl. No.: 08/794,212

[22] Filed: Jan. 30, 1997

[30] Foreign Application Priority Data

Jan. 31, 1996 [JP] Japan ................................... 8-035725

[51] Int. Cl.⁷ .............................. H02K 5/24; F04D 29/04
[52] U.S. Cl. ........................................................ 310/90.5
[58] Field of Search .......................... 310/90.5; 318/382; 388/801, 803; 73/458

[56] References Cited

U.S. PATENT DOCUMENTS

| | | | |
|---|---|---|---|
| 3,650,581 | 3/1972 | Boden et al. | 310/90.5 |
| 4,128,795 | 12/1978 | Habermann et al. | 318/618 |
| 4,568,865 | 2/1986 | Welburn | 310/185 |
| 4,609,332 | 9/1986 | Miki et al. | 310/90.5 |
| 4,697,128 | 9/1987 | Matsushita et al. | 310/90.5 |
| 4,885,491 | 12/1989 | Hiyama et al. | 310/90.5 |
| 4,963,804 | 10/1990 | Geiger | 318/460 |
| 4,999,534 | 3/1991 | Andrianos | 310/90.5 |
| 5,107,192 | 4/1992 | Kirchberg et al. | 318/540 |
| 5,256,952 | 10/1993 | Yoneyama et al. | 318/629 |
| 5,355,042 | 10/1994 | Lewis et al. | 310/90.5 |
| 5,408,875 | 4/1995 | Matsushita et al. | 73/462 |
| 5,576,587 | 11/1996 | Takahashi et al. | 310/90.5 |

FOREIGN PATENT DOCUMENTS

| | | | |
|---|---|---|---|
| 470637A1 | 2/1992 | European Pat. Off. | |
| 56-63116 | 5/1981 | Japan | 310/90.5 |
| 60-256620 | 12/1985 | Japan | 310/90.5 |
| 2130655 | 6/1984 | United Kingdom | |

OTHER PUBLICATIONS

Translation of JP 60–256620 (Murakami et al.).

*Primary Examiner*—Nestor Ramirez
*Assistant Examiner*—Burton S. Mullins
*Attorney, Agent, or Firm*—Adams & Wilks

[57] ABSTRACT

To prevent the problem of dragging on an auxiliary bearing which tends to occur in a motor in the vicinity of a resonance point of rigid mode during the start-up of a three axis control magnetic bearing apparatus, a radial position correcting electromagnet is provided. The radial position correcting electromagnet has a magnetic pole extending in the direction of a radius of a metal disc of the motor through which the motor shaft passes. A voltage having a short period is applied to the radial position correcting electromagnet at a plurality of times in the vicinity of the resonance point of rigid mode upon start-up of the motor to attract the metal disc and thereby adjust the radial position of the shaft to prevent excessive contact between the shaft and other parts of the three axis control magnetic bearing apparatus.

30 Claims, 6 Drawing Sheets

FIG. 8

MAGNETIC BEARING APPARATUS WITH RADIAL POSITION CORRECTING ELECTROMAGNET

BACKGROUND OF THE INVENTION

1. Field of the Invention

This invention relates to a magnetic bearing apparatus, and particularly to a magnetic bearing apparatus with a radial position correcting electromagnet for preventing a phenomenon of dragging on an auxiliary bearing that tends to occur in the vicinity of the resonance point of rigid mode (hereinafter called the first resonance point) on starting of a three axes control magnetic bearing apparatus.

2. Description of the Prior Art

Figure 8:
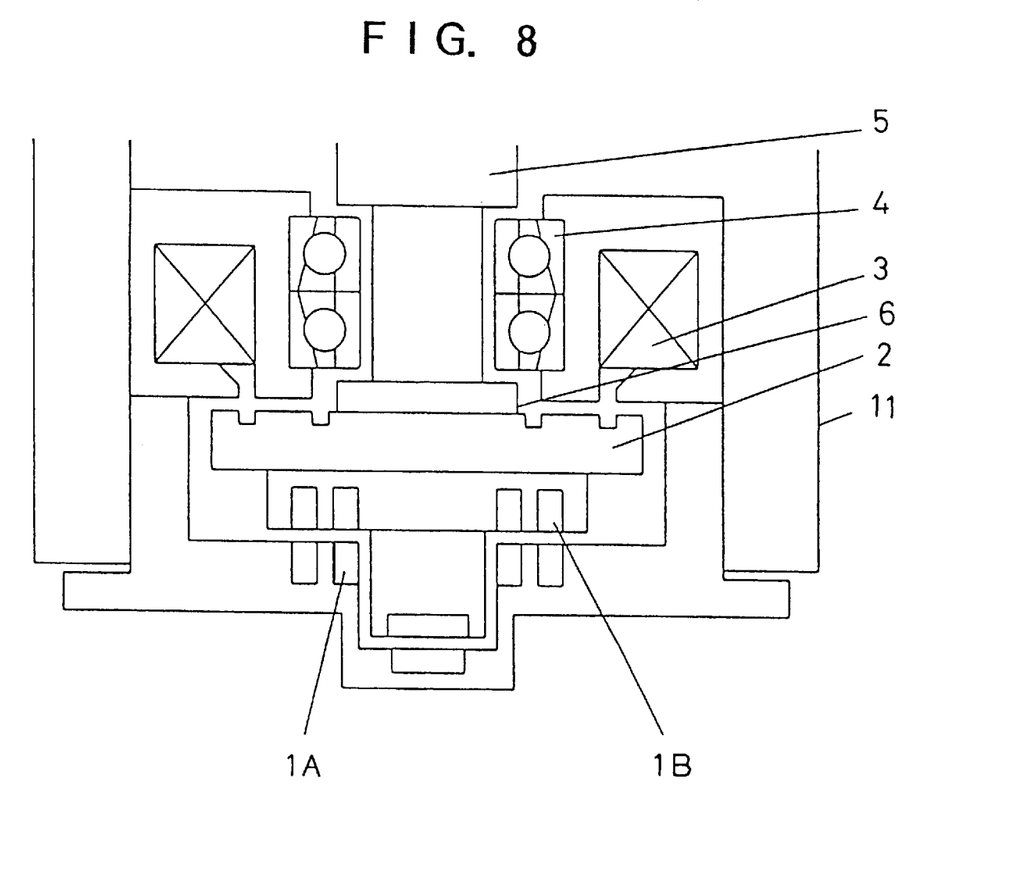
FIG. 8 is a vertical sectional view of a magnetic bearing part of a conventional three axis control turbo-molecular pump.

On the basis of FIG. 8, a turbo-molecular pump in which a conventional three axis control magnetic bearing apparatus has been applied will be described. FIG. 8 shows a vertical sectional view of a magnetic bearing part of a three axis control turbo-molecular pump. Lower side permanent magnets 1A are disposed in the lower end of a frame 11 of the turbo-molecular pump. Upper side permanent magnets 1B face the lower side permanent magnets 1A across a small gap. The lower side permanent magnets 1A and the upper side permanent magnets 1B have different poles so that they attract each other. The upper side permanent magnets 1B are fixed to the lower end face of a metal disc 2. A collar 6 is disposed on the upper end face of the metal disc 2, and a shaft 5 passes through the central part of the metal disc 2, the upper side permanent magnets 1B and the collar 6. Axial electromagnets 3 are constituted so that they support the metal disc 2 and the shaft 5 in midair. An auxiliary bearing 4 is provided to prevent damage caused by mechanical contact between the shaft 5 and the axial electromagnets 3 and other elements occurring in the case of breakdown of the electromagnets.

While the pump is running, the magnetic bearing part supports the shaft 5 in midair by means of a balance of the force of the axial electromagnets 3 attracting the metal disc 2 and the attracting force between the lower side permanent magnets 1A and the upper side permanent magnets 1B.

However, in a conventional three axis control turbo-molecular pump, a phenomenon of vibration of the shaft 5 becoming large when the speed reaches the vicinity of the first resonance point upon start-up has sometimes been produced.

In a three axis control turbo-molecular pump, vibration of the shaft 5 is usually controlled by the attractive force between the lower side permanent magnets 1A and the upper side permanent magnets 1B. However, because with the attractive force of permanent magnets the rigidity is weak, there has been a danger of it not being possible to stably absorb vibration occurring at the first resonance point. In this case, it sometimes happens that the shaft 5 and the auxiliary bearing 4 accelerate while still in contact with each other (hereinafter called the drag phenomenon). This phenomenon most readily occurs due to a cause such as impurities entering inside the turbo-molecular pump thereby causing the amount of unbalance of the shaft 5 to have increased. When the shaft 5 and the auxiliary bearing 4 are continuously in contact with each other, the durability of the auxiliary bearing 4 falls. Also, the contact noise at this time is considerably large and the speed sometimes does not rise as far as the rated speed.

SUMMERY OF THE INVENTION

The present invention was made in view of the above-described drawbacks of the conventional magnetic bearing apparatus, and has as an object providing a magnetic bearing apparatus with a radial position correcting electromagnet which prevents the phenomenon of dragging on the auxiliary bearing 4 that tends to occur in the vicinity of the first resonance point on the start-up of a three axis control magnetic bearing apparatus.

For this object, in accordance with the present invention, in a three axis control magnetic bearing apparatus having a lower side permanent magnet disposed in one end face of a frame, an upper side permanent magnet facing the lower side permanent magnet across a small gap, a metal disc having the lower side permanent magnet fixed in one end face thereof and having a shaft passing through a central part thereof, an axial electromagnet for attracting the metal disc and supporting the shaft in midair and an auxiliary bearing for preventing mechanical damage from occurring in cases such as breakdown of the axial electromagnet, the three axis control magnetic bearing apparatus is constructed such that a radial direction attracting electromagnet is fixed to the frame so that a magnetic pole of the radial direction attracting electromagnet faces one radial direction end of the metal disc across a small gap and a voltage pulse having a short period is applied to the radial direction attracting electromagnet so that the metal disc is attracted thereto on the starting up of the three axis control magnetic bearing apparatus, in the vicinity of the resonance point of the rigid mode as the speed of the three axis control magnetic bearing apparatus passes through at least one predetermined speed.

In accordance with the present invention, the bearing is constructed such that the direction of attraction of the metal disc by the radial direction attracting electromagnet coincides with the direction of a magnetomotive force produced in the radial direction attracting electromagnet.

Further, in accordance with the present invention (claim 3), the bearing is constructed such that the direction of attraction of the metal disc by the radial direction attracting electromagnet is at right angles with the direction of a magnetomotive force produced in the radial direction attracting electromagnet.

DETAILED DESCRIPTION OF THE PREFERRED EMBODIMENTS

Embodiments of the invention will now be described on the basis of the accompanying drawings. Elements that are the same as those shown in FIG. 8 have been given the same symbols and their description is omitted.

Figure 1:
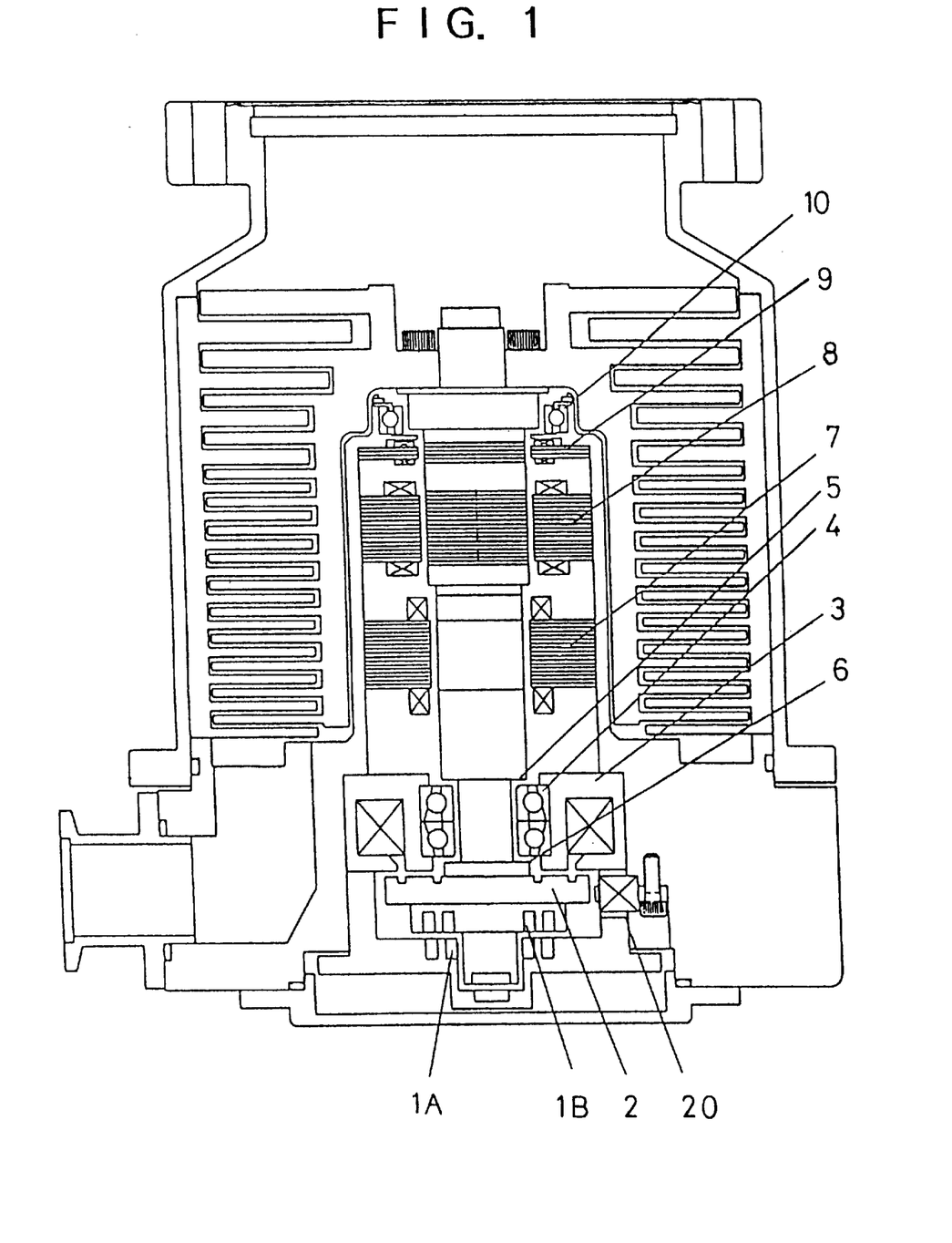
FIG. 1 is a vertical sectional view of the overall construction of the first embodiment.

A first embodiment of the invention is shown in FIG. 1 through FIG. 4. In FIG. 1 a vertical sectional view of the overall construction of the first embodiment is shown. A drive motor 7 is made up of a rotor and a stator, and by being supplied with power from a direct current power supply, it can rotate at a high speed. A radial direction electromagnet 8 carries out adjustment of the radial position of the shaft 5 on the basis of a radial position detected by a radial sensor 9. An auxiliary bearing 10, like the auxiliary bearing 4, is provided to prevent damage caused by mechanical contact. A radial direction attracting electromagnet 20 is disposed with a magnetic pole thereof facing one radial end of the metal disc 2 across a small gap and is used for attracting the metal disc 2, and is equivalent to a radial direction position correcting electromagnet.

Figure 2:
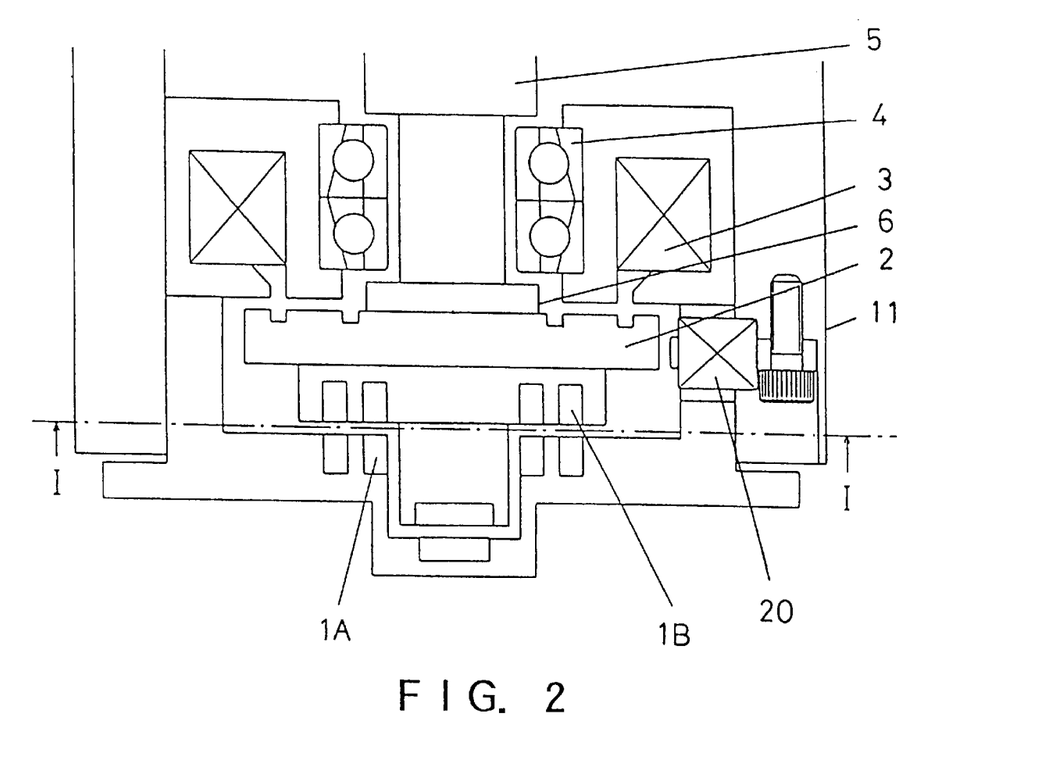
FIG. 2 is an enlarged view of a magnetic bearing part of the first embodiment.
Figure 3:
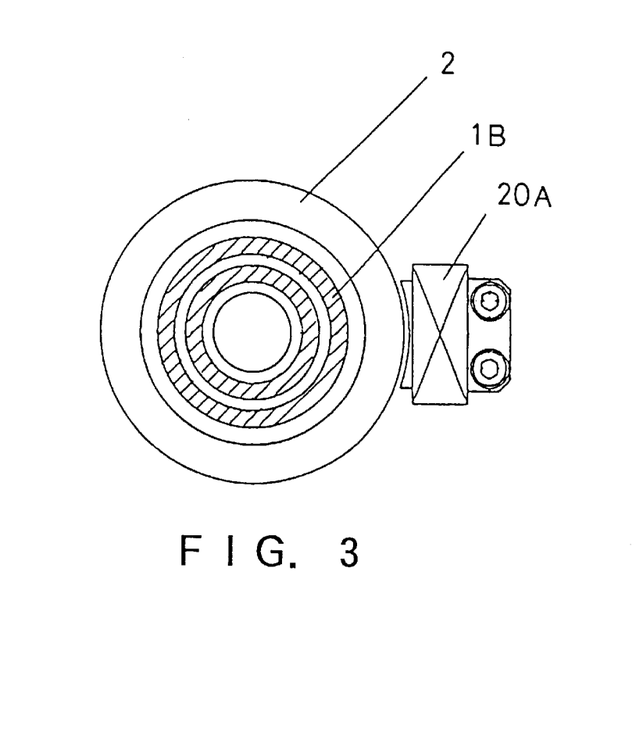
FIG. 3 is a sectional view on the arrow view line I—I in FIG. 2.

In FIG. 2, an enlarged view of the magnetic bearing part of the first embodiment is shown, and in FIG. 3 a sectional view taken along the arrow view line I—I is shown.

The operation thereof will now be described.

The radial direction attracting electromagnet 20 is provided to release drag when imbalance of the shaft 5 has occurred and the shaft 5 has become continuously in contact with the auxiliary bearing 4. For example when a turbo-molecular pump whose rated speed is about 44,000 rpm is used, the first resonance point exists in the vicinity of 5,000 rpm, and it has been confirmed by the inventor hereof by experiment that to release drag it is adequate to apply a voltage having a short period (about 1 second or less) divided over a plurality of times to the radial direction attracting electromagnet 20 in the vicinity of the first resonance point (4,000 to 6,000 rpm). If such a voltage is applied similarly below the point of 4,000 rpm, the inertial force of the shaft 5 is not yet sufficient and the drag phenomenon tends to occur nonetheless. At speeds At over 6,000 rpm, because the inertial force (which acts with the square of the angular velocity) of the shaft 5 has become too large, an electromagnet having a large attracting force becomes necessary for release of the drag. Therefore, in this embodiment a voltage pulse is applied to the radial direction attracting electromagnet 20 once at each of the speeds of 4,000 rpm, 5,000 rpm and 6,000 rpm. However, the set speeds and number of voltage pulses are based on experimental tentative proposals and are not limited to these values. To make control simple and to be sure of certainty of protection, even if the drag is released at the 4,000 rpm point, a voltage is still applied to the radial direction attracting electromagnet 20 at the 5,000 rpm and 6,000 rpm points.

When a voltage is applied to the radial direction attracting electromagnet 20, the metal disc 2 is attracted in the radial direction and the contact between the shaft 5 and the auxiliary bearing 4 is released, and thereafter vibration due to the shaft 5 is absorbed by the attrative force between the lower side permanent magnets 1A and the upper side permanent magnets 1B.

The speed of the turbo-molecular pump may be detected by providing a sensor, but because the speed is already being controlled by a controller (not shown), application of the pulse voltage to the radial direction attracting electromagnet 20 at each speed can also be controlled by extracting the speed from this controller. In this case, a control circuit for controlling the radial direction attracting electromagnet 20 can be made in a known manner by changing some software and hardware of the existing controller.

Because the location of the first resonance point differs depending on the type and the material and so on of the turbo-molecular pump, the optimum control (set speeds of voltage pulse application times, number of voltage pulses, pulse width, capacity of electromagnet) for releasing the drag phenomenon differs on a case by case basis.

Figure 4:
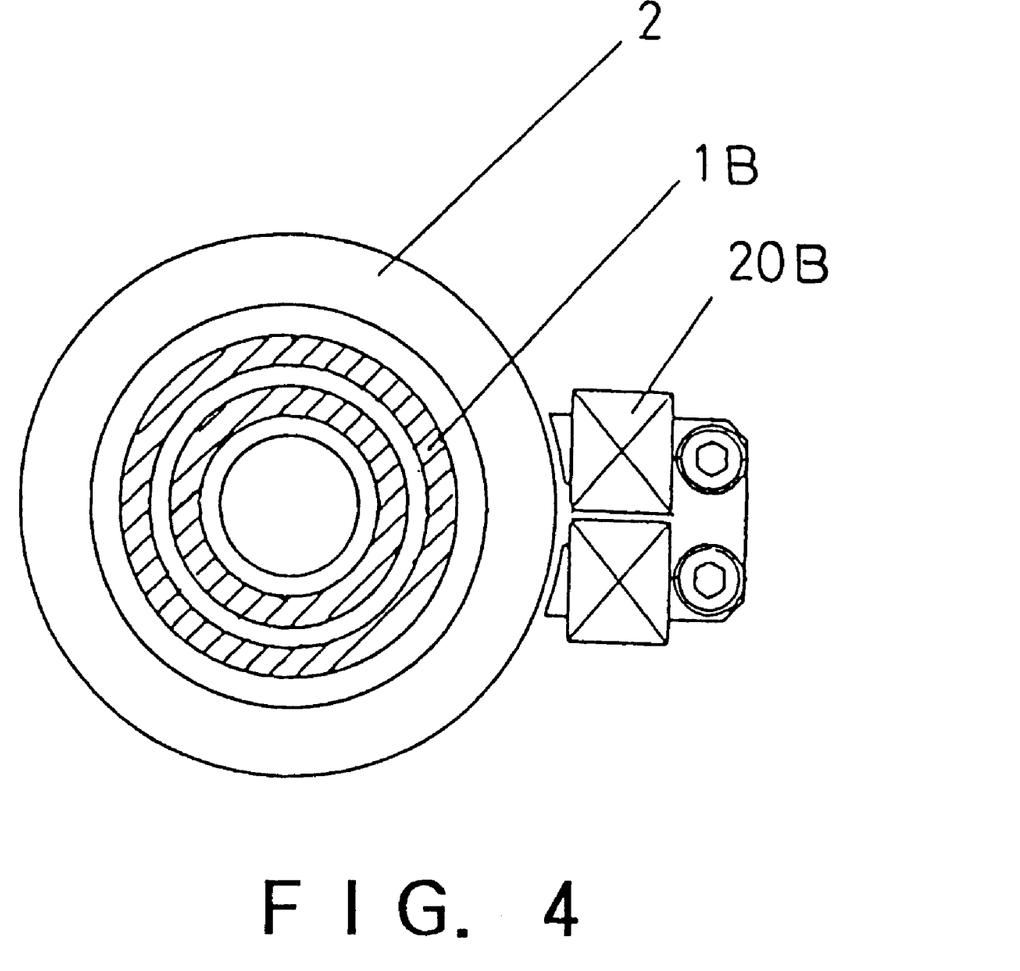
FIG. 4 is a sectional view on the arrow view line I—I in a case wherein a horseshoe-shaped electromagnet is used as a radial direction attracting electromagnet in FIG. 2.

FIG. 3 shows a case wherein a radial attracting electromagnet 20A which is a bar-shaped electromagnet is used, and this has the merit that it is compact and lightweight. On the other hand, FIG. 4 shows a case wherein a radial direction attracting electromagnet 20B which is a horseshoe-shaped electromagnet is used. With a horseshoe-shaped electromagnet, generally more than a bar-shaped electromagnet it is possible to obtain a strong attraction force in proportion with its volume capacity. Also, because there are magnetic pole faces facing the metal disc 2 in two places, attracting forces having a predetermined spacing act in two locations. The coils of the radial direction attracting electromagnet 20B are wound in mutually different directions.

Figure 5:
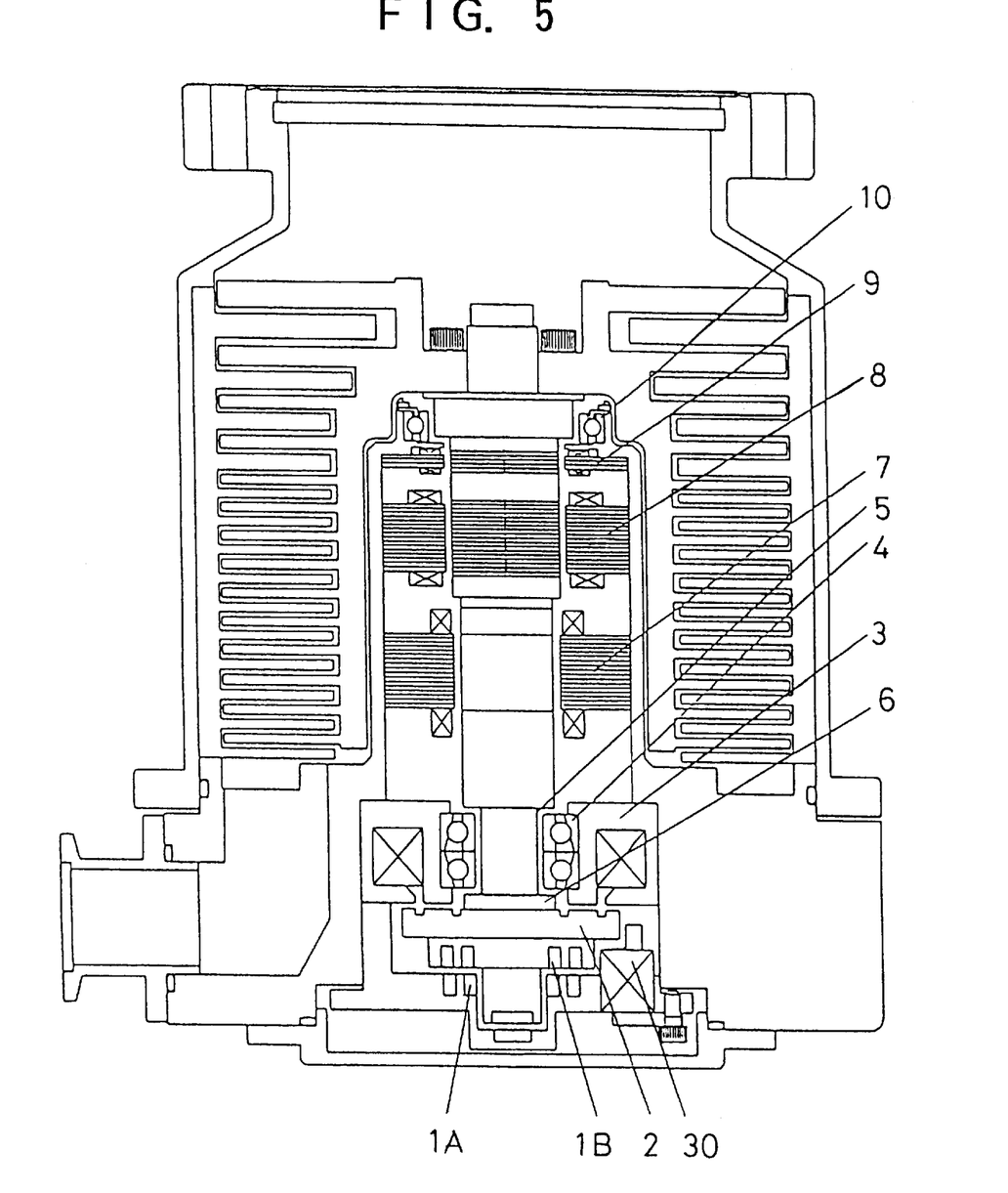
FIG. 5 is a vertical sectional view of the overall construction of a second embodiment.
Figure 6:
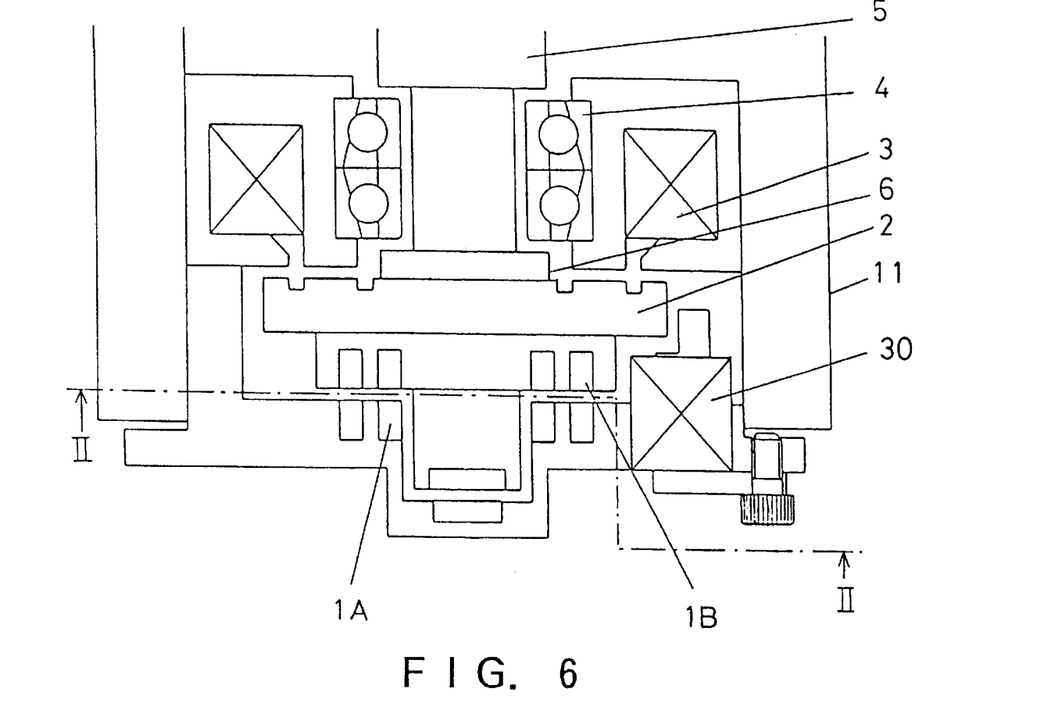
FIG. 6 is an enlarged view of a magnetic bearing part of the second embodiment.
Figure 7:
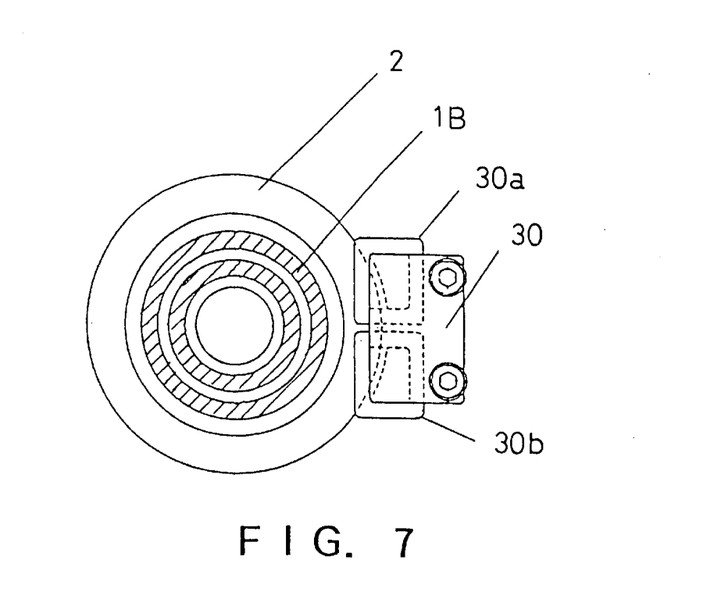
FIG. 7 is a sectional view on the arrow view line II—II in FIG. 6.

Next, a second embodiment of the invention is shown in FIG. 5 through FIG. 7. Parts or elements that are the same as in the first embodiment have been given the same symbols and their description is omitted.

FIG. 5 shows a vertical sectional view of the overall construction of the second embodiment. FIG. 6 shows an enlarged view of the magnetic bearing part of the second embodiment, and FIG. 7 shows a sectional view taken along the arrow view line II—II.

A radial attracting electromagnet 30 is fixed in an L-shape to the lower end face of the frame 11 of the turbo-molecular pump. Coils 30a and 30b are wound in mutually different directions.

In the first embodiment shown in FIGS. 1–4, for the magnetic pole face the same face as the magnetomotive force direction M was made with respect to the metal disc 2, but in the second embodiment shown in FIGS. 5–7, a magnetic pole face at right angles to the magnetomotive force direction M was made with respect to the metal disc 2. In this way, according to the type of the turbo-molecular pump, selecting a radial direction attracting electromagnet taking into consideration structural aspects and economy and the like becomes possible.

The polarity of the radial direction attracting electromagnet 20 or 30 with respect to the metal disc 2, since the object being attracted is the metal disc 2 and is silicon steel, may be made with an N-pole or may be made with an S-pole.

As described above, according to this invention, because it has a construction wherein a magnetic pole of a radial direction attracting electromagnet is provided across a small gap from one radial end of a metal disc and a short period voltage pulse is applied at every set speed in the vicinity of the first resonance point so that the metal disc is attracted, it is possible to prevent the shaft and the auxiliary bearing accelerating while still in contact. As a result, it is possible to increase the durability of the auxiliary bearing and it is possible to maintain the performance that the three axis control magnetic bearing apparatus originally has.

Also, according to this invention, selecting a radial direction attracting electromagnet taking into consideration structural aspects and economy and the like of a three axis control magnetic bearing apparatus becomes possible.

What is claimed is:

1. In a three axis control magnetic bearing apparatus disposed in a frame of a motor, having a lower side permanent magnet disposed in one end of the frame, an upper side permanent magnet disposed in the frame so as to be facing the lower side permanent magnet and separated therefrom by a small gap, a metal disc disposed in the frame and having the upper side permanent magnet fixed to one side thereof and having a shaft of the motor passing through a central opening formed therein, an axial electromagnet for attracting the metal disc and supporting the shaft in mid air, and an auxiliary bearing for preventing mechanical damage from occurring in the event of breakdown of the axial electromagnet, the improvement comprising: a radial position correcting electromagnet disposed in the frame and having a magnetic pole extending in the direction of a radius of the metal disc, the radial position correcting electromagnet being disposed adjacent to the metal disc and spaced therefrom by a small gap and being responsive to a voltage having a short period applied thereto on the starting up of the three axis control magnetic bearing apparatus in the vicinity of a resonance point of rigid mode of the shaft, as the speed of the three axis control magnetic bearing apparatus reaches at least one predetermined speed, for attracting the metal disc to correct a radial position of the shaft to prevent excessive contact between the shaft and the auxiliary bearing in the vicinity of the resonance point of rigid mode.

2. A magnetic bearing apparatus having a radial position correcting electromagnet according to claim 1; wherein the direction of attraction of the metal disc by the radial position correcting electromagnet coincides with the direction of a magnetomotive force produced in the radial position correcting electromagnet.

3. A magnetic bearing apparatus having a radial position correcting electromagnet according to claim 1; wherein the direction of attraction of the metal disc by the radial position correcting electromagnet is at a right angle with respect to the direction of a magnetomotive force produced in the radial position correcting electromagnet.

4. A magnetic bearing apparatus having a radial position correcting electromagnet according to claim 1; wherein the lower side permanent magnet and the upper side permanent magnet have different poles so that they attract each other.

5. A magnetic bearing apparatus having a radial position correcting electromagnet according to claim 1; further comprising a collar disposed on a side of the metal disc opposite the side on which the upper side permanent magnet is fixed, the collar having a central opening therethrough; wherein the shaft passes through the central opening in the collar, the disc and the upper side permanent magnet.

6. A magnetic bearing apparatus having a radial position correcting electromagnet according to claim 1; wherein the auxiliary bearing is disposed between the shaft and the axial electromagnet.

7. A magnetic bearing apparatus having a radial position correcting electromagnet according to claim 1; wherein the auxiliary bearing comprises a first auxiliary bearing disposed at an end of the frame proximate the metal disc and a second auxiliary bearing disposed at an opposite end of the frame.

8. A magnetic bearing apparatus having a radial position correcting electromagnet according to claim 1; wherein the attractive force between the axial electromagnet and the metal disc is balanced with the attractive force between the lower side permanent magnet and the upper side permanent magnet to support the shaft of the motor in mid air.

9. A magnetic bearing apparatus having a radial position correcting electromagnet according to claim 1; further comprising a radial sensor mounted in the frame for detecting a radial position of the shaft, and a radial electromagnet for carrying out adjustment of the radial position of the shaft on the basis of the radial position detected by the radial sensor.

10. A magnetic bearing apparatus having a radial position correcting electromagnet according to claim 1; wherein the radial position correcting electromagnet is responsive to a voltage having a short period applied thereto at motor speeds slightly less than, equal to, and slightly greater than the resonance point of the rigid mode to prevent excessive contact between the shaft of the motor and the auxiliary bearing.

11. A magnetic bearing apparatus having a radial position correcting electromagnet according to claim 1; wherein the radial position correcting electromagnet comprises a bar-shaped electromagnet.

12. A magnetic bearing apparatus having a radial position correcting electromagnet according to claim 1; wherein the radial position correcting electromagnet comprises a horseshoe-shaped electromagnet having coils wound in different directions.

13. A magnetic bearing apparatus for a motor, comprising: at least one permanent magnet disposed in one end of a frame of the motor; a metal disc disposed in the frame adjacent to the permanent magnet, the metal disc having a central opening therethrough receptive of a shaft of the motor; an axial electromagnet for attracting the metal disc and levitating the shaft; an auxiliary bearing for preventing contact of the shaft and the axial electromagnet; and a radial position correcting electromagnet disposed in the frame adjacent the metal disc, the radial position correcting electromagnet having a magnetic pole extending in a direction of a radius of the metal disc and being responsive to a voltage having a short period applied thereto in the vicinity of a resonance point of rigid mode of the shaft, as the speed of the motor reaches at least one predetermined speed, for attracting the metal disc to correct the radial position of the shaft and to prevent drag between the shaft and the auxiliary bearing.

14. A magnetic bearing apparatus according to claim 13; wherein the at least one permanent magnet comprises a lower side permanent magnet disposed in one end of the frame on one side of the metal disc, and an upper side permanent magnet disposed in the frame so as to face the lower side permanent magnet and be separated therefrom by a small gap.

15. A magnetic bearing apparatus according to claim 14; wherein the lower side permanent magnet and the upper side permanent magnet have different poles so that they attract each other.

16. A magnetic bearing apparatus according to claim 14; further comprising a collar disposed on a side of the metal disc opposite the side on which the upper side permanent magnet is disposed, the collar having a central opening therethrough; wherein the shaft passes through the central opening in the collar, the disc and the upper side permanent magnet.

17. A magnetic bearing apparatus according to claim 14; wherein the attractive force between the axial electromagnet and the metal disc is balanced with the attractive force between the lower side permanent magnet and the upper side permanent magnet to levitate the shaft.

18. A magnetic bearing apparatus according to claim 13; wherein the direction of attraction of the metal disc by the radial position correcting electromagnet coincides with the direction of a magnetomotive force produced in the radial position correcting electromagnet.

19. A magnetic bearing apparatus according to claim 13; wherein the direction of attraction of the metal disc by the radial position correcting electromagnet is at a right angle with respect to the direction of a magnetomotive force produced in the radial position correcting electromagnet.

20. A magnetic bearing apparatus according to claim 13; wherein the auxiliary bearing is disposed between the shaft and the axial electromagnet.

21. A magnetic bearing apparatus according to claim 13; wherein the auxiliary bearing comprises a first auxiliary bearing disposed at an end of the frame proximate the metal disc and a second auxiliary bearing disposed at an opposite end of the frame.

22. A magnetic bearing apparatus according to claim 13; further comprising a radial sensor mounted in the frame for detecting a radial position of the shaft, and a radial electromagnet for carrying out adjustment of the radial position of the shaft on the basis of the radial position detected by the radial sensor.

23. A magnetic bearing apparatus according to claim 13; wherein the radial position correcting electromagnet is responsive to a voltage having a short period applied thereto at motor speeds slightly less than, equal to, and slightly greater than the resonance point of rigid mode to prevent excessive contact between the shaft of the motor and the auxiliary bearing.

24. A magnetic bearing apparatus according to claim 13; wherein the radial position correcting electromagnet comprises a bar-shaped electromagnet.

25. A magnetic bearing apparatus according to claim 13; wherein the radial position correcting electromagnet comprises a horseshoe-shaped electromagnet having coils wound in different directions.

26. A magnetic bearing apparatus for a motor, comprising: first permanent magnets; second permanent magnets disposed in confronting and spaced-apart relation to the first permanent magnets so that the first and second permanent magnets attract each other; a metal disc disposed adjacent to the second permanent magnets, the metal disc having a central opening therethrough receptive of a rotational shaft; an axial electromagnet for attracting the metal disc and levitating the shaft; and radial position correcting electromagnetic means responsive to a voltage applied thereto when the rotational shaft rotates at a speed in the vicinity of a resonance point of rigid mode of the rotational shaft for attracting the metal disc to correct the radial position of the rotational shaft.

27. A magnetic bearing apparatus as claimed in claim 26; wherein the radial position correcting electromagnetic means is disposed adjacent to the metal disc and spaced therefrom by a small gap and has a magnetic pole extending in the direction of a radius of the metal disc.

28. A magnetic bearing apparatus as claimed in claim 26; wherein the direction of attraction of the metal disc by the radial position correcting electromagnetic means coincides with the direction of a magnetomotive force produced in the radial position correcting electromagnetic means.

29. A magnetic bearing apparatus as claimed in claim 26; wherein the direction of attraction of the metal disc by the radial position correcting electromagnetic means is at a right angle with respect to the direction of a magnetomotive force produced in the radial position correcting electromagnetic means.

30. A magnetic bearing apparatus as claimed in claim 26; further comprising an auxiliary bearing for preventing mechanical damage from occurring in the event of breakdown of the axial electromagnet; and wherein the radial position correcting electromagnetic means is responsive to the voltage applied thereto in the vicinity of the resonance point of rigid mode of the rotational shaft for attracting the metal disc to correct the radial position of the rotational shaft and to prevent drag between the rotational shaft and the auxiliary bearing.

* * * * *